United States Patent
Radscheit et al.

[15] 3,681,344
[45] Aug. 1, 1972

[54] CERTAIN CARDIOACTIVE OXIDO-BUFADIENOLIDES

[72] Inventors: Kurt Radscheit, Kelkhein/Taunus; Ulrich Stache; Werner Haede, both of Hofheim/Taunus; Werner Fritsch, Neuenhain/Taunus; Ernst Lindner, Frankfurt/Main, all of Germany

[73] Assignee: Farbwerke Hoechst Aktien-gesellschaft vormals Meister Lucius & Bruning, Frankfurt/Main, Germany

[22] Filed: Dec. 2, 1969

[21] Appl. No.: 881,581

[30] Foreign Application Priority Data

Dec. 5, 1968 Germany............P 18 12 945.8

[52] U.S. Cl.............................260/239.57, 260/999
[51] Int. Cl............................................C07c 173/04
[58] Field of Search......./Machine Searched Steroids

[56] References Cited

UNITED STATES PATENTS 3,325,484   6/1967   Deghenghi...............260/239.55

OTHER PUBLICATIONS

Djerassi " Steroid Reactions" pp. 598 (1963).

*Primary Examiner*—Henry A. French
*Attorney*—Curtis, Morris & Safford

[57] ABSTRACT

Cardioactive oxido-bufadienolides of the formula

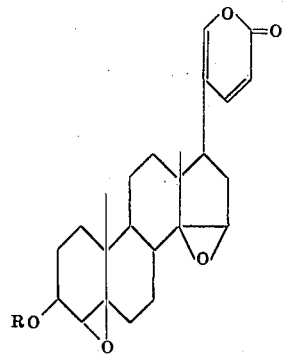

wherein R is hydrogen or lower acyl. Methods of making such compounds.

2 Claims, No Drawings

CERTAIN CARDIOACTIVE OXIDO-BUFADIENOLIDES

The present invention relates to oxido-bufadienolides of the formula I

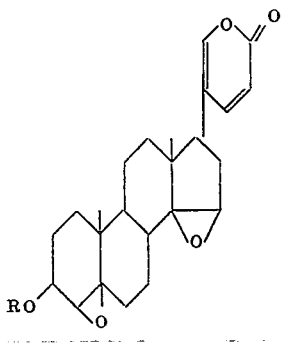

in which R represents hydrogen or an acyl group having one to five carbon atoms.

The present invention also relates to a process for the manufacture of the above-specified compounds of the formula I, wherein a. 14-anhydro-scillarenone (3-oxo-bufa-4, 14,20(21) 22(23) tetraenolide) is reduced to yield 14-anhydro-scillarenine, this compound is acylated in 3-position, the 3α-acyloxy-compound thus obtained is reacted with N-bromic acid amides to yield 3α-acyloxy-4α, 14α-dihydroxy-5β, 15β-dibromo-bufadienolide, the latter compound is treated with agents that split off HBr and, if desired to obtain the hydroxy compound, in the compounds obtained the 3α-acyl group is hydrolyzed, or b. 3α-hydroxy-14, 15α-epoxy-bufa-4,20(21),22(23) trienolide is treated with per-acids and, if desired to obtain an acyloxy compound, the product is subsequently acylated in the 3-position.

The individual steps of the process are shown in the following formula scheme:

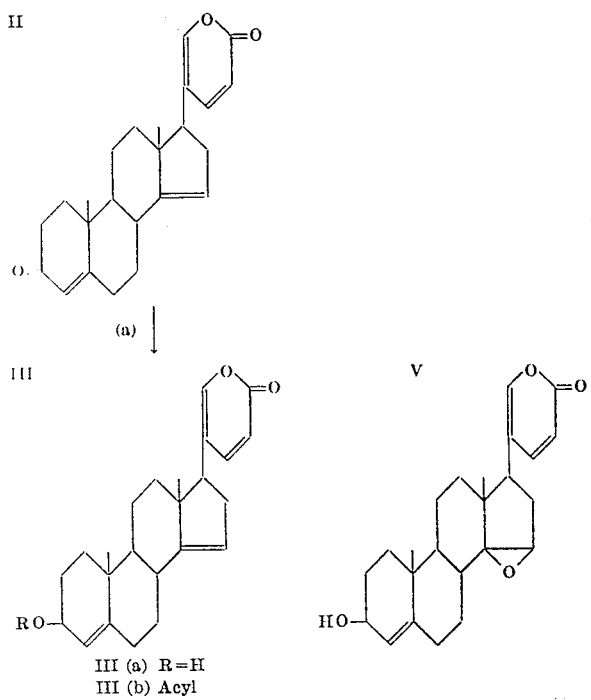

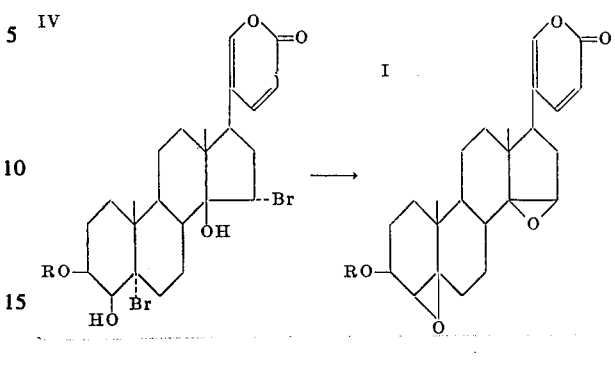

The individual process steps are carried out as is usual in steroid chemistry. For the reduction of the 3-keto group in II, metal hydrides, preferably sodium borohydride, lithium borohydride or lithium-tri-(tert.butoxy)-aluminum hydride are preferably used. The reaction of IIIb to yield the bromohydrin IV may be effected, for example, by treatment with N-bromo-acetamide in dioxane in the presence of perchloric acid or by reaction with N-bromo-sulfonamides, preferably of aromatic sulfonic acids, for example N,N-dibromobenzene-sulfonamide, in weakly acid solution, for example in acetic acid. The bromohydrin IV need not be purified, it may be reacted directly to form the epoxide I. This reaction is effected in the usual manner with agents that split off HBr, for example organic bases such as pyridine, triethylamine, 1,5-diaza-bicyclo-[4,3,0]-5-nonene or by means of aluminum oxide, silica gel, sodium acetate, or sodium carbonate.

In the manufacture of compound I starting from V by means of per-acids according to method (b), mono-per-phthalic acid, per-benzoic acid or mono-chloro-per-benzoic acid is preferably used.

Compound II can be prepared, starting from the 15α-hydroxy desoxy-corticosterone known from the literature, by successive oxidation of the 21-hydroxyl group, acetalization of the 21-aldehyde group that has formed, tosylation of the hydroxyl group in 15α-position, formation of the Δ14-double bond by splitting off toluene-sulfonic acid by means of lithium carbonate, protection of the 3-keto group by enol ester formation with ortho-formic acid ester, formation of the 20,22-epoxide with trimethyl-sulfonium iodide/NaH, simultaneous separation of the acetal and enol-ester groups and cleavage of the epoxide ring with HBr, restoration of the 20,22-epoxide ring with triethylamine from the bromohydrin that has formed, selective condensation of the 21-aldehyde group with carbomethoxymethyl-diethyl phosphonate to yield the 21-carbomethoxymethane compound under conservation of the 3-keto group, isomerization of the 20,22-epoxide ring with boron-trifluoride etherate to yield the 22-aldehyde and ring closure by means of aqueous-methanolic HCl to yield the compound II. This process is described in commonly owned copending U.S. Pat. application Ser. No. 735,964, filed by K. Radscheit et al. on June 11, 1968, now U. S. Pat. No. 3,574,198 granted 4/6/71.

Compound V can be prepared starting from II in known manner by reaction with N-bromo-acetamide/per-chloric acid to yield 14,15-bromohydrin, separation of HBr and formation of the epoxide ring by treatment with a base, and reduction of the keto group in 3-position to a hydroxy group by means of lithium-tri-(tert.butoxy)-aluminum hydride.

The products obtained according to the present invention are novel and they are distinguished by a strongly positive inotropic action and, as a consequence thereof, by a strongly marked cardio-activity. They are, therefore, suitable for the medicinal treatment of heart damages, especially for the treatment of cardiac insufficiency and tachycardia. They are preferably administered in the form of tablets or dragees which contain, in addition to the active substances, the usual adjuvants and excipients, for example lactose, starch, tragacanth, etc.

The products of the invention may also be used as intermediates in the manufacture of medicaments, for example, by conversion of the 3-hydroxy compounds into corresponding derivatives such as esters or ethers, usual in steroid chemistry.

The following examples illustrate the invention:

EXAMPLE 1

$3\beta$-Acetoxy-4,5$\alpha$:14,15$\alpha$-bis-oxido-bufa-20(21),22(23-dienolide a. $3\beta$-Hydroxy-bufa-4,14,20(21),22(23)-tetraenolide (IIIa) (Anhydro-scillarenin)

A solution of 3.75 g of lithium-tri-(tert.butoxy)-aluminum hydride in 16.0 ml of absolute tetrahydrofurane was added dropwise, while stirring, at −10° to −5° C to a solution of 518 mg of 3-oxo-bufa-4,14,20(21),22(23)-tetraenolide(II)in 52 ml of absolute tetrahydrofurane. Stirring was continued for 2¼ hours at −3° to 0° C and then 20 ml of a 5 percent aqueous acetic acid were added slowly and dropwise. While cooling intensely, the whole was further stirred for 30 minutes. The reaction mixture was combined with water and extracted with methylene chloride. The methylene chloride was then removed by distillation, whereupon a crystalline residue was obtained which was recrystallized from a mixture of methylene chloride and ether with the addition of 2 drops of pyridine. 377 mg of compound IIIa (14-anhydro-scillarenine) melting at 198°–200° C (Kofler block) were obtained.

Characteristic infrared bands: 3480, 1735 and 1715, (shoulder) 1700, 1625,1530 cm$^{-1}$.

Ultraviolet spectrum $\lambda_{max} = 299 - 300$ m$\mu$, $\epsilon = 5450$.

b. $3\beta$-Acetoxy-bufa-4,14,20(21),22(23)-tetraenolide (IIIb) 250 mg of $3\beta$-hydroxy-bufa-4,14,20(21),22(23)-tetraenolide in a mixture of 4 ml of pyridine and 2 ml of acetic anhydride were allowed to stand for 17 hours at 20° C. The reaction mixture was poured into about 50 ml of water and, after standing for 17 hours, the oil that had separated was isolated by decantation. It was dissolved in methylene chloride, the solution was washed with water until neutrality, and the methylene chloride was removed by distillation. The $3\beta$-acetoxy-bufa-4,14,20(21),22(23)-tetraenolide was obtained in the form of a crude amorphous foam which was further reacted according to (c) without purification.

Characteristics infrared bands: 1715–1745, 1630, 1530, 1230 cm$^{-1}$, no hydroxyl band.

Ultraviolet spectrum: $\lambda_{max}$ 298 – 299 m$\mu$, $\epsilon = 5050$.

c. $3\beta$-Acetoxy-4,5$\beta$:14,15$\beta$-bis-oxido-bufa-20(21),22(23-dienolide (I)

A solution of $3\beta$-acetoxy-bufa-4,14,20(21),22(23)-tetraenolide (IIIb) in 9 ml of dioxane was combined with 0.32 ml of glacial acetic acid, 2.7 ml of water and 210 mg of N,N-dibromo-benzene-sulfonamide and the whole was allowed to stand for 3 hours at 0° – 20° C in darkness. The reaction mixture was then poured into 100 ml of water and extracted several times with methylene chloride. The extracts were washed with water and the solvents were removed by distillation under reduced pressure at a maximum temperature of 40° C. The remaining $3\beta$-acetoxy-4$\beta$,14$\beta$-dihydroxy-5$\alpha$, 15$\alpha$-dibromo-bufa-20(21),22(23)-dienolide (IV) was dissolved in a small amount of a mixture of methylene chloride and benzene (2:1) and poured onto a column of aluminum oxide Woelm neutral, activity degree II (height 10 cm, diameter 2 cm). After allowing the column to stand for 20 minutes, elution was effected with a mixture of methylene chloride and benzene (2:1). A total of 300 ml of eluant was collected and, after removal of the solvents by distillation, 175 mg of compound I were obtained. After recrystallization from a mixture of methylene chloride and ether, the compound was found to melt at 210° – 211° C.

Characteristic infrared bands: 1715–1740, 1625, 1530, 1235 cm$^{-1}$, no hydroxyl band.

Ultraviolet spectrum: $\lambda_{max} = 298 - 299$ $\mu$, $\epsilon = 5770$.

EXAMPLE 2

$3\beta$-Acetoxy-4,5$\beta$:14,15$\beta$-bis-oxido-bufa-20(21),22(23)-dienolide

A solution of 200 mg of 14,15$\beta$-oxido-scillarenin, (V) melting point 163° – 165° C, in 30 ml of methylene chloride was combined with a solution of 290 mg of mono-per-phthalic acid in ether and the whole was allowed to stand for 5 hours at room temperature. The reaction solution was washed with a sodium bicarbonat solution and water, dried over sodium sulfate, and evaporated to dryness under reduced pressure. The crude product so obtained was dissolved in 5 ml of pyridine. The solution was combined with 2 ml of acetic acid anhydride and left for 18 hours at room temperature. Further working up was carried out as described in Example 1c), The residue was recrystallized from a mixture of methylene chloride and ether. Melting point 210° – 211° C (Kofler block).

Preparation of the starting compound 14,15$\beta$-oxido-scillarenin (V):

3-Oxo-14,15$\beta$-oxido-bufa-4,20(21),22(23)-trienolide (14,15$\beta$-Oxido-scillarenone):

200 mg of crude 3-oxo-14$\beta$-hydroxy-15$\alpha$-bromo-bufa-4,20(21),22(23)-trienolide (prepared by reaction of 14-anhydro-scillarenone with perchloric acid and N-bromo-acetamide in dioxane at 15° C under exclusion of light) were chromatographed on acid aluminum oxide of activity degree II. Elution was effected with benzene and methylene chloride, the eluates were evaporated to dryness, and the residue was triturated with ether. Crystals melting at 169° – 172° C were obtained.

$3\beta$-Hydroxy-14,15$\beta$-oxido-bufa-4,20(21),22(23)-trienolide (14,15$\beta$-Oxido-scillarenin) V:

130 mg of 14,15β-oxido-scillarenone were dissolved in 10 ml of absolute tetrahydrofurane, the solution was combined at −10° C with a solution of 873 mg of LiAlH[OC(CH₃)₃]₃ in 3.2 ml of tetrahydrofurane. After a reaction time of 1 hour at room temperature, the mixture was poured into 80 ml of water and filtered. The filtrate was extracted with chloroform and the extract was washed, dried and evaporated. The residue was dissolved hot in a small amount of acetone and, after cooling, the solution was combined with ether. 120 mg of product having a melting point of 163° – 165° C were obtained.

Infrared spectrum: 3420–3460, 1700–1750, 1625, 1535 cm⁻¹.

Ultraviolet spectrum: 297 mμ (4160).

What we claim is:

1. An oxide bufadienolide of the formula

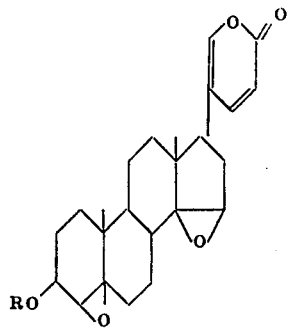

in which R represents hydrogen or an acyl group having one to five carbon atoms.

2. 3β-Acetoxy-4,5β-bis-oxide-bufa-20(21),22(23)-dienolide.

* * * * *